United States Patent [19]

Lampl

[11] Patent Number: 4,758,389
[45] Date of Patent: Jul. 19, 1988

[54] METHOD OF CONTROLLING THE MOLD FILLING PROCESS IN A PLASTICS INJECTION MOLDING APPARATUS

[75] Inventor: Alfred Lampl, Schwertberg, Austria

[73] Assignee: Engel Maschinenbau Gesellschaft m.b.H., Austria

[21] Appl. No.: 837,090

[22] Filed: Mar. 5, 1986

[30] Foreign Application Priority Data

Mar. 8, 1985 [AT] Austria .................................. 706/85

[51] Int. Cl.⁴ .............................................. B29C 45/76
[52] U.S. Cl. ................................ 264/40.1; 264/297.2; 264/328.1
[58] Field of Search ................... 264/40.5, 40.7, 297.2, 264/328.1, 328.13, 335; 425/145, 149

[56] References Cited

U.S. PATENT DOCUMENTS

| | | | |
|---|---|---|---|
| 3,721,512 | 3/1973 | Ma et al. | 264/40.7 X |
| 4,066,725 | 1/1978 | Boettner | 264/40.3 X |
| 4,146,601 | 3/1979 | Bishop | 264/328.13 |
| 4,579,515 | 4/1986 | Kawaguchi et al. | 425/136 |

*Primary Examiner*—Jan H. Silbaugh
*Assistant Examiner*—MaryLynn Fertig
*Attorney, Agent, or Firm*—McGlew and Tuttle

[57] ABSTRACT

Described is a method of controlling the mold filling process of a plastics injection molding wherein, for the purposes of avoiding fluctuations in the mass of the moldings, due to material not being of a uniform quality, the change-over point between the filling phase and the back-pressure phase is shifted by a predetermined value in dependence on the injection work which is detected during the filling phase.

3 Claims, 1 Drawing Sheet

METHOD OF CONTROLLING THE MOLD FILLING PROCESS IN A PLASTICS INJECTION MOLDING APPARATUS

FIELD AND BACKGROUND OF THE INVENTION

The invention relates to a method of controlling the mold filling process in a plastics injection molding apparatus, which has a filling phase with a controlled speed for the injection piston and a post-pressure on back-presure phase with a controlled hydraulic pressure applied to the injection piston, wherein the injection work which is performed between two positions of the injection piston is determined and the change-over between the filling phase and the post-pressure phase is effected independence on the detected value of the injection work.

It is known for example from PLASTverarbeiter 34, volume 1983, No. 10, pages 1105-1108, that monitoring the relationship between hydraulic pressure and flow speed makes it possible in particular to compare the viscosities of the molding materials. The same work also already gave a fairly complicated process for determining the value in respect of the injection work, that corresponds to complete filling of the mold, the attainment of that value then supplying the signal for the step of changing over to the post-pressure phase. Correction of the post-pressure independence on the injection work which is detected in the same cycle is indicated therein as a possibility.

It has also already been proposed in DE-A-26 05 037 that the level of the post-pressure may be altered in order to avoid fluctuations in the desired quality of the molding, which would have been expected without that alteration on the basis of measurements made in the same cycle. In that process, just as for example in accordance with GB-A-1 459 673, measurements are made in particular in respect of the internal pressure in the mold and the time at which it reaches a maximum, which indicates complete filling of the mold.

Continuously monitoring the internal pressure of the mold has been found to be difficult, particularly in regard to the production of moldings of a complicated configuration. At any event it represents an operation which increases the moulding costs.

The present invention is therefore based on the problem of providing for information about the molding quality to be expected, on the basis of measurements which are made in the production of a molding at the injection molding apparatus itself, and thereby supplying a parameter which makes it possible to prevent an undesired change in quality by influencing the manufacturing process.

In solving the above-indicated problem, it was first found that influencing the level of the post or back-pressure at a time when the internal pressure of the mold has already exceeded its maximum and the mold is therefore completely filled, has only a slight influence on the final result. It was surprisingly found however that, in order to avoid fluctuations in quality, in particular in the mass of the moldings due to the material not being of a uniform nature, the change-over point between the filling phase and the post-pressure phase is displaced by a predetermined value in dependence on the injection work which is detected during the filling phase. In accordance with the invention therefore the effect of fluctuations in material may be compensated by virtue of the fact that the change-over point between the filling phase and the post-pressure or back-pressure phase is not only approximately equated to the moment of complete filling of the mold, whereas the level of the post pressure is selected independently of the fluctuating quality of material. The underlying reason for that mode of operation is based on the following consideration: as is already known, for example the mass of the moulding fluctuates independence of the viscosity of the material used, in respect of which the injection work WE between two predetermined positions of the piston forms a measurement. Hitherto that piece of knowledge has only been used to treat automatically as waste moldings in which the deviation, as detected in the injection cycle, in respect of the injection work from the normal value, leads to the expectation of an excessive deviation in the mass of the molding from the normal value.

The novel and surprising factor was to find that, by virtue of influencing a single parameter, namely the change-over point between the filling phase and the post-pressure phase, it is possible to compensate for the influence of all fluctuations in the quality of the material, which are involved in the value in respect of the injection work. In the first instance attention would be directed in this case to a change in temperature in order to adjust the viscosity to a normal value, but changes in temperature can only be attained with a considerable delay and in addition they have a reaction effect on the entire system. A change in the speed of the piston in the filling phase, which in itself would be possible, would at most be possible in the cycle following the measurements in respect of the injection work. Correction of the post- or back-pressure, which is proposed in the publication referred to in the opening part of this specification, becomes increasingly ineffective with increasing progress in the post-pressure phase, that is to say, as the sealing point is approached. An alternative expedient is afforded by virtue of departing, in the manner proposed according to the invention, from the requirement which in itself is soundly based from the theoretical point of view (see PLASTverarbeiter 34th volume 1983, No. 5, page 430), of causing the time of changing over to the post-pressure phase, that is to say, from the condition of flow which is governed by the machine to the flow which is governed by the tool, to coincide precisely with that moment at which the mold is just filled.

The relationship between the extent to which the change-over point is shifted and the injection work which depends on the material is to be established in accordance with the invention in such a way that, for various materials which differ slightly in regard to their properties, the change-over point is shifted until the desired quality of molding and in particular the desired mass or the desired dimensions, are attained. If the relevant value for the injection work is plotted in a graph, interpolation gives that change-over point which is to be selected for a material which is still unknown and in respect of which the injection work has been ascertained in the first part of the injection cycle.

BRIEF DESCRIPTION OF THE DRAWINGS

Details of the invention are described hereinafter with reference to the drawing in which.

DESCRIPTION OF THE PREFERRED EMBODIMENTS

The producers of raw material endeavour to supply the processor with molding materials having raw material properties which are as constant as possible. In order to compensate for fluctuations in charge, the polymerisation products of different charges are mixed together. However, in spite of the efforts made by the producers of raw material, fluctuations in the properties of the material may occur if for example the raw materials come from different polymerisation installations or even from different producers. It is then found that, because of altered molecular weight distributions or a differing glass fibre content in the raw materials, injection molding machines, in spite of constant processing conditions, nonetheless produce rejects.

Figure 1:
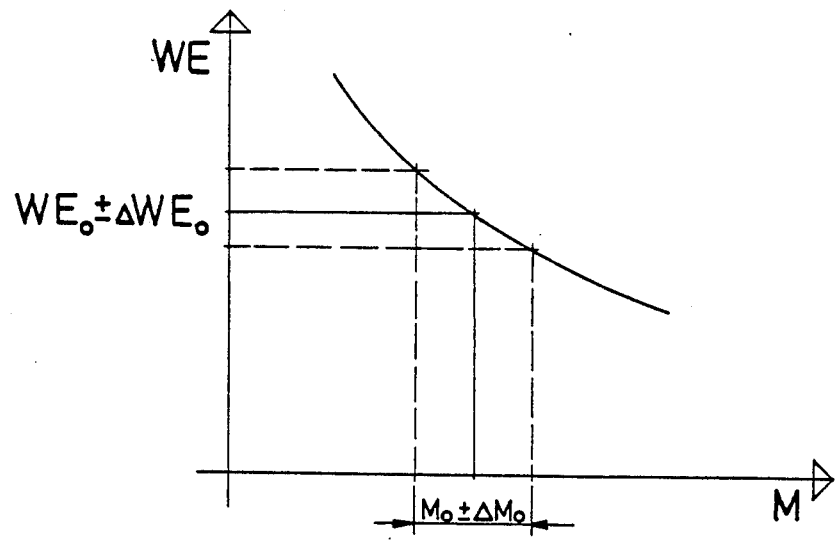
FIG. 1 shows the per se known relationship between injection work and mass of the molding.

It is already known that fluctuations in constitution or composition of the starting material may be reproduced by a relationship as shwon in FIG. 1. The moldings produced therefore are only of the desired mass $M_o$ when the injection work assumes an associated value $WE_o$. In the event of deviations in the injection work from that value, the mass of the molding alters, for which reason measurement of the injection work can be utilized in order beforehand to make an assumption about the quality of the product of the process and to eliminate without further investigation moldings which were produced with an injection work which deviated to an excessive degree. In that respect measurement of the injection work is more logically effected between two points which do not embrace the entire screw travel in the filling operation. In that way it is possible to eliminate effects which are only related to the acceleration of the screw at the beginning of the filling operation, while on the other hand there is the possibility of advancing the change-over time by a desired amount.

Figure 2:
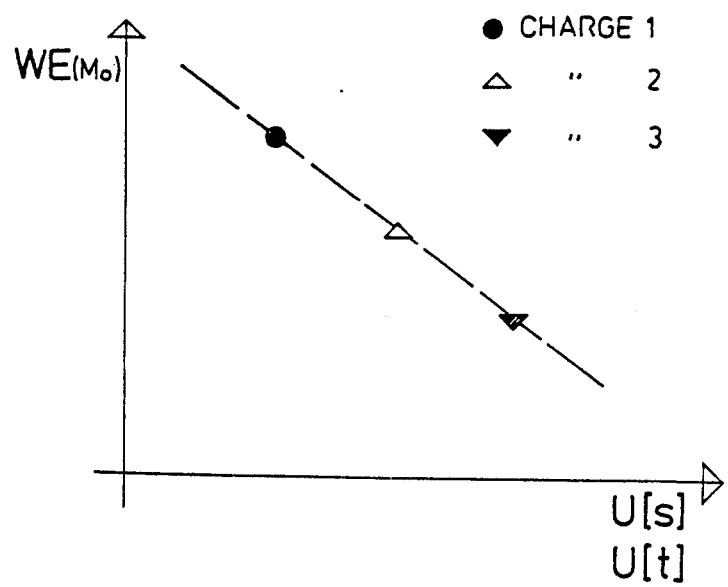
FIG. 2 shows the possibility of achieving a constant quality in the finished product by virtue of varying the change-over point when dealing with a varying composition of material which is characterised by the injection work.

As can be seen from FIG. 2, a predetermined value $M_o$ in respect of the mass of the molding can be imposed for any quality of material which fluctuates from one charge to another and which is characterised by a given injection work, by virtue of altering the time at which the process is switched over to the post pressure that is lower than the filling pressure. Instead of being dependent on time $U[t]$, it will be appreciated that the change-over point may also be taken in dependence on the position $U[s]$ of the piston as the screw piston is at a given location at any time. The curve which is produced in that way, as shown in FIG. 2, is then used, in relation to an injection operation with charges of an initially unknown composition, after ascertaining the injection work, still in the same cycle, to fix the change-over point in such a way as to provide the desired mass $M_o$ of the molding.

In this way, several charges may be plotted from the graph of FIG. 2 where the injection work WE is the abscissa and the change-over point is the ordinate. As shown in FIG. 2, several charges, charge 1, charge 2, and charge 3 are plotted thereby, the produced curve may be used in relation to an injection operation even with charges having composition which were initially unknown. Thus, while still in the same cycle, after ascertaining the injection work, a change-over point may be fixed so as to provide any desired mass $M_o$ of molding.

I claim:

1. A method for controlling a mold filling process in a plastic injection molding apparatus having an injection piston which is movable at a controlled speed during a filling phase and against which a controlled hydraulic pressure is applied during a back-pressure phase, comprising: plotting the detached injection work which is performed between two positions of the injection piston, during the filling phase, for a plurality of known materials against the change-over point between the filling phase and the back-pressure phase for those materials to provide a curve representing combinations of the value of injection work versus the value for the change-over point which leads to a mass of predetermined value; detecting the injection work during the filling phase of a mold filling process; selecting from said curve the change-over point between the filling phase and the post pressure phase corresponding to the injection work detected; and effecting the change-over at the selected change-over point.

2. A method according to claim 1, wherein the change-over point is a point in time between the filling phase and the back-pressure phase, the selected change-over point being a time value.

3. A method according to claim 2, wherein the injection molding apparatus is filled at a certain point in time during one of the filling phase and the back-pressure phase, the method including selecting the change-over point independently of the certain point in time at which the injection molding apparatus is filled.

* * * * *